(12) United States Patent  (10) Patent No.: US 7,443,578 B2
Yamazaki et al.  (45) Date of Patent: Oct. 28, 2008

(54) MICROSCOPIC ILLUMINATION APPARATUS

(75) Inventors: Kentaro Yamazaki, Hamburg (DE); Yuichiro Hashimoto, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/491,084

(22) Filed: Jul. 24, 2006

(65) Prior Publication Data
US 2007/0024966 A1   Feb. 1, 2007

(30) Foreign Application Priority Data
Jul. 26, 2005  (JP)  ............................. 2005-215992

(51) Int. Cl.
*G02B 21/06*  (2006.01)
*G02B 27/10*  (2006.01)
(52) U.S. Cl. ...................... 359/387; 359/618; 359/619; 359/627
(58) Field of Classification Search ................. 359/618, 359/387, 385, 389, 390, 619, 620, 627, 633
See application file for complete search history.

(56) References Cited

U.S. PATENT DOCUMENTS

| 5,657,166 | A  | * | 8/1997 | Otaki ......................... 359/661 |
| 6,507,434 | B2 | * | 1/2003 | Miyashita ................... 359/387 |
| 6,614,596 | B2 | * | 9/2003 | Gladnick .................... 359/630 |
| 6,692,647 | B2 | * | 2/2004 | Moshrefzadeh et al. ....... 216/24 |
| 2002/0012164 | A1 | | 1/2002 | Miyashita |
| 2002/0141051 | A1 | * | 10/2002 | Vogt et al. ................... 359/385 |
| 2002/0191281 | A1 | * | 12/2002 | Osa et al. .................... 359/385 |
| 2003/0030902 | A1 | * | 2/2003 | Fukushima et al. ......... 359/388 |
| 2005/0073742 | A1 | * | 4/2005 | Weyh et al. ................. 359/385 |

FOREIGN PATENT DOCUMENTS

| DE | 28 46 056 | 4/1979 |
| EP | 1 008 884 | 6/2000 |
| JP | 59-007325 | 1/1984 |
| JP | 59 111124 | 6/1984 |
| JP | 08-101344 | 4/1996 |

* cited by examiner

*Primary Examiner*—Ricky Mack
*Assistant Examiner*—Brandi N Thomas
(74) *Attorney, Agent, or Firm*—Kenyon & Kenyon LLP

(57) ABSTRACT

An illumination optical system includes a light source section for emitting a beam of substantially parallel rays, a field lens for collecting the beam of substantially parallel rays, a condenser lens for introducing the beam of rays collected by the field lens onto an illumination target surface, and an aperture stop disposed at an entrance-side focal position of the condenser lens. The aperture stop and the light source are in conjugate positional relationship via the collector lens and the field lens. An optical element having different characteristics between the central region and the outer region is arranged in a path of the substantially parallel rays at a position satisfying the condition:

$$0.03 < |L/f_{CD}| < 0.4$$

where $F_{CD}$ is a focal length of the condenser lens and L is a distance from the illumination target surface to a position that is, of positions on which the optical element is projected, closest to the illumination target surface.

4 Claims, 13 Drawing Sheets

MICROSCOPIC ILLUMINATION APPARATUS

This application claims benefits of Japanese Patent Application No. 2005-215992 filed in Japan on Jul. 26, 2005, the contents of which are hereby incorporated by reference.

BACKGROUND OF THE INVENTION

1) Field of the Invention

The present invention relates to a microscopic illumination apparatus.

2) Description of Related Art

FIG. 1 is a schematic configuration diagram that shows one configuration example of the microscopic transmitting illumination apparatus conventionally used in common.

The conventional microscopic illumination apparatus as shown in FIG. 1 is provided with: a lamp house 1 having a light source 2 and a collector lens 3 for converting a beam of divergent rays emanating from the light source 2 into a beam of substantially parallel rays; a field stop 4 disposed at a position conjugate with an illumination target surface 8 for regulating an illuminated area; and a field lens 5 for converting the beam of substantially parallel rays from the lamp house 1 into a beam of convergent rays. Via the collector lens 3 and the field lens 5, the light source 2 is projected at a position of an aperture stop 6 disposed at an entrance-side focal position of a condenser lens 7. A specimen surface, as the illumination target surface 8, is illuminated via the condenser lens 7 with the light from the light source 1 converging on the aperture stop 6. The reference numeral 20 denotes a mirror. It is noted that, in the drawings included in the present application, showing the prior art or the present invention, like reference numerals are used to denote like elements or components.

The illumination optical system of the commonly used, conventional microscopic illumination apparatus as shown in FIG. 1 is disclosed, for example, in Japanese Patent Application Preliminary Publication No. Hie 08-101344.

In recent microscopy, specimens are often photographed via digital cameras, whereas the digital cameras, which use sensors such as CADS or CMOS, are more sensitive to brightness variation than direct observation by human eyes or photographing by silver halide cameras. Therefore, in photographing via a digital camera, illumination unevenness, which should have not mattered under direct eye observation or photographing via a silver halide camera, is conspicuous. By this reason, for a microscope in which photographing is performed via a digital camera, the illumination system is increasingly required to achieve uniform illumination by precluding illumination unevenness as much as possible.

The illumination system shown in FIG. 1 as a configuration example is called Knelled illumination, which is configured to allow, theoretically, a specimen to be exposed to illumination free from uneven brightness. In practice, however, intensity distribution of light with respect to directions of rays emitted from the light source is not uniform, as shown in FIG. 2A. Consequently, intensity distribution of light with respect to distance from the optical axis in the plane A in the microscopic illumination apparatus shown in FIG. 1, for example, is non-uniform as shown in FIG. 2B and accordingly illumination unevenness occurs. If angular distribution of rays emitted from the light source could be made uniform, uniform illumination without uneven brightness would be achieved. However, this is difficult in practice. To solve this problem, as a measure for reducing illumination unevenness caused by angular distribution of rays emitted from a light source, there has been a conventional method in which an integrator typified by a fly-eye lens divides a beam of rays into multiple beams to be evenly used for illumination.

FIG. 3 is a schematic configuration diagram that shows a conventional example of the microscopic illumination apparatus in which an integrator is used. In this microscopic illumination apparatus, a beam of divergent rays from a light source 2 is converted into a beam of substantially parallel rays via a collector lens 3, to be incident on the integrator 9. The integrator 9 is arranged, via a projecting lens 10 and a field lens 5, to be in conjugate positional relationship with an aperture stop 6 disposed at an entrance-side focal position of a condenser lens 7. Rays incident on the integrator 9 are spread with a same aperture angle both at the optical axis and a region off the optical axis. Here, since the integrator 9 and the entrance-side focal position of the condenser lens 7 are in conjugate positional relationship, both of rays emergent from the axial position (drawn with broken lines) and rays emergent from an off-axis position (drawn with solid lines), on the integrator 9, illuminate a same range on the illumination target surface 8. Therefore, even if distribution of amount of light of the beam of substantially parallel rays is not uniform, uniform illumination without uneven brightness can be accomplished on the illumination target surface 8 upon the beam of rays being divided at the integrator 9 and each of the multiple beams as divided being dispersed. A microscopic illumination apparatus using an integrator as shown in FIG. 3 is disclosed, for example, in the Japanese Patent Application Preliminary Publication (KOKAI) No. 2002-6225. The reference numeral 20 denotes a mirror.

SUMMARY OF THE INVENTION

An illumination apparatus according to the present invention is provided with: a light source section having a light source, to emit a beam of substantially parallel rays; a field lens for collecting the beam of substantially parallel rays; a condenser lens for introducing the beam of rays collected by the field lens to an illumination target surface; and an aperture stop disposed at an entrance-side focal position of the condenser lens, the aperture stop and the light source being in substantially conjugate positional relationship, characterized in that an optical element having different characteristics between a central region and an outer region is arranged in a path of the beam of substantially parallel rays.

In the microscopic illumination apparatus according to the present invention, it is preferred that the optical element is arranged at a position that is conjugate with a position distant from the illumination target surface by L satisfying the following condition:

$$0.03 < |L/f_{CD}| < 0.4$$

where $f_{CD}$ is a focal length of the condenser lens, and L is a distance from the illumination target surface to a position that is, of positions on which the optical element is projected, closest to the illumination target surface.

In the microscopic illumination apparatus according to the present invention, it is preferred that the optical element is constructed of a cutoff portion that cuts off rays incident on the central region and a transmissive portion that transmits rays incident on the outer region.

In the microscopic illumination apparatus according to the present invention, it is preferred that the optical element is composed of an attenuating portion that transmits only a part of rays incident thereon, and that the attenuating portion has a lowest transmittance in the central region and a highest transmittance in an outmost region.

In the microscopic illumination apparatus according to the present invention, it is preferred that a transmittance of the attenuating portion varies stepwise from the central region to the outmost region.

In the microscopic illumination apparatus according to the present invention, it is preferred that the optical element is composed of a diffusing portion that diffuses rays, and that the diffusing portion has a largest diffusion angle in the central region and a smallest diffusion angle at an outmost region.

In the microscopic illumination apparatus according to the present invention, it is preferred that a diffusion angle of the diffusing portion varies stepwise from the central region to the outmost region.

In the microscopic illumination apparatus according to the present invention, it is preferred that the optical element is composed of a diffusing portion that diffuses rays incident on the central region and an attenuating portion that attenuates an amount of light incident on the outer region.

In the microscopic illumination apparatus according to the present invention, it is preferred that the optical element is composed of a diffusing portion that diffuses rays incident on the central region and a transmissive portion that transmits rays incident on the outer region.

In the microscopic illumination apparatus according to the present invention, it is preferred that the optical element is composed of an optical integrator configured to have an aperture characteristic distribution such that apertures are smaller in a region farther from the central region.

In the microscopic illumination apparatus according to the present invention, the optical element is composed of an optical integrator arranged in the central region and an attenuating portion that attenuates an amount of light and that is arranged in the outer region.

In the microscopic illumination apparatus according to the present invention, it is preferred to include a mechanism for making the optical element insertable and removable.

In the microscopic illumination apparatus according to the present invention, it is preferred that the optical element is composed of an LAD and that the LAD is configured to have a transmittance characteristic changeable between a state where a transmittance is lowest in the central region and highest in an outmost region and a state where the transmittance is uniform.

In the microscopic illumination apparatus according to the present invention, it is preferred that the optical element is composed of a DAD and that micro mirrors constituting the DAD are controllable with respect to orientation of reflecting surfaces thereof such that a ray coming from a collector lens, which is included in the light source section, and incident in a region farther from the central region is reflected to be less inclined away from the condenser lens as it is incident on the condenser lens.

In the microscopic illumination apparatus according to the present invention, it is preferred that the optical element is composed of a collective of surface emitting LEADS constructed and arranged to have a higher emission intensity in a region farther from the central region and is configured as the light source section.

In the microscopic illumination apparatus according to the present invention, it is preferred that the collective includes a plurality of surface emitting LEADS having a same emission intensity and arranged at a higher density in a region farther from the central region.

In the microscopic illumination apparatus according to the present invention, it is preferred that the collective is segmented into a plurality of concentric blocks, that LEADS arranged in a block located farther from the central region have a higher emission intensity, and that LEADS arranged in a same block have a same emission intensity.

In the microscopic illumination apparatus according to the present invention, it is preferred that the collective is segmented into a plurality of concentric blocks, and that an emission intensity of LEADS is adjustable by individual blocks in which the LEADS are arranged.

In the microscopic illumination apparatus according to the present invention, it is preferred that the optical element is composed of a collective of surface emitting LEADS constructed and arranged to have a narrower directionality in a region farther from the central region and is configured as the light source section.

In the microscopic illumination apparatus according to the present invention, it is preferred that the collective is segmented into a plurality of concentric blocks, that LEADS arranged in a block located farther from the central region have a narrower directionality, and that LEADS arranged in a same block have a same directionality.

In the microscopic illumination apparatus according to the present invention, it is preferred to further arrange, at an entrance-side focal position of the condenser lens, a second optical element having different characteristics between a central region and an outer region thereof.

In the microscopic illumination apparatus according to the present invention, it is preferred that the second optical element is composed of a second attenuating portion that transmits only a part of incident rays, and that the second attenuating portion has a highest transmittance in the central region and a lowest transmittance in an outmost region.

In the microscopic illumination apparatus according to the present invention, it is preferred that a transmittance of the second attenuating portion varies stepwise from the central region to the outmost region.

According to the present invention, it is possible to provide a microscopic illumination apparatus that can efficiently achieve uniform illumination distribution with a simplest structure. The microscopic illumination apparatus according to the present invention is useful particularly in the fields of medical science and biology, where photographing by digital cameras is required in microscopy.

The features and advantages of the present invention will become apparent from the following detailed description of the preferred embodiments when taken in conjunction with the accompanying drawings.

BRIEF DESCRIPTION OF THE DRAWINGS

FIG. 2A shows intensity distribution of light with respect to angular direction of rays emitted from the light source, and FIG. 2B shows intensity distribution of light with respect to distance from the optical axis in plane A.

DETAILED DESCRIPTION OF THE PREFERRED EMBODIMENTS

Preceding the description of the embodiments, function and effect of the microscopic illumination apparatus according to the present invention are explained more specifically.

The microscopic illumination apparatus according to the present invention is configured to provide an optical element having different characteristics between the central region and the outer region. This optical element is configured to cut off, attenuate or diffuse light that enters the central region thereof, in particular. This arrangement would assure uniform illumination by reducing illumination intensity in the axial region on the illumination target surface.

Figure 1:
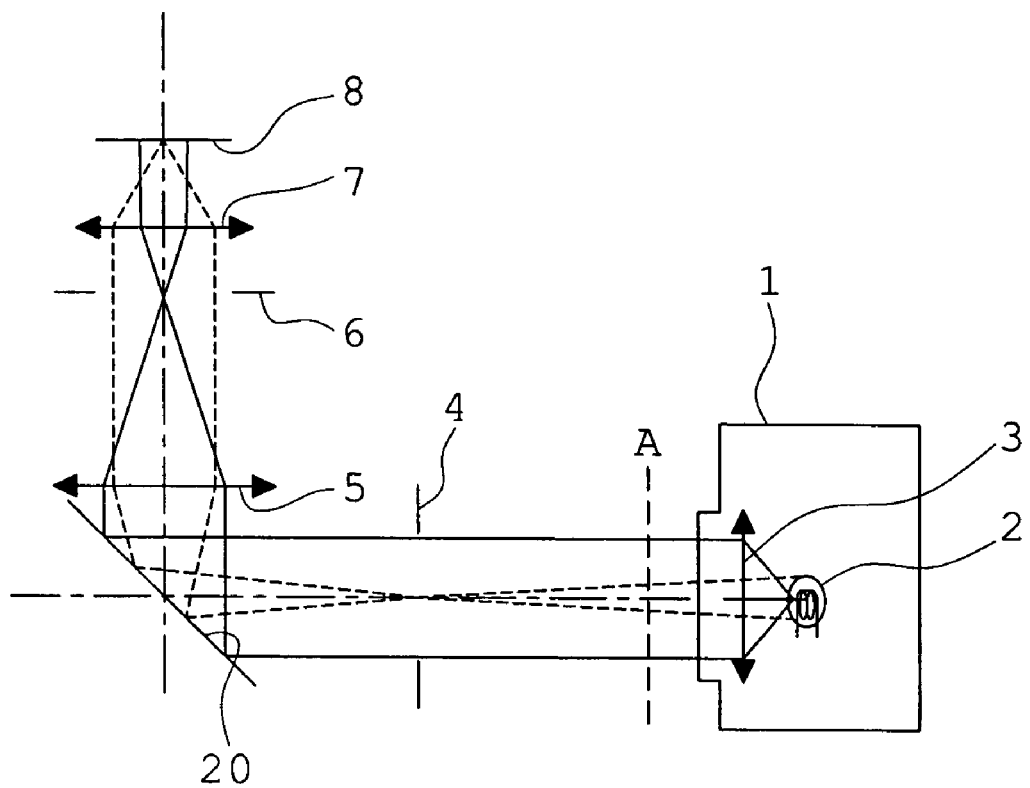
FIG. 1 is a schematic configuration diagram that shows one configuration example of the microscopic transmitting illumination apparatus conventionally used in common.
Figure 2A:
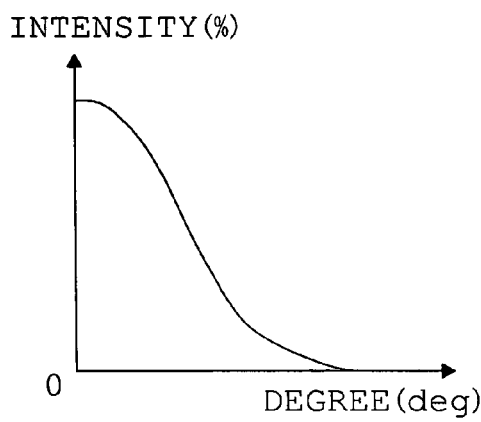
FIGS. 2A and 2B are graphs that show intensity distribution of light in the microscopic transmitting illumination apparatus shown in FIG. 1, where
Figure 2B:
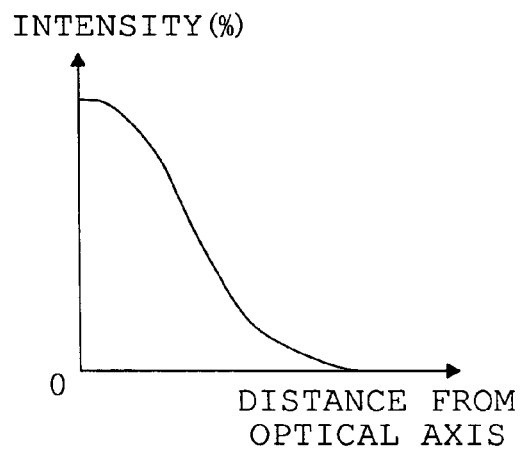
Figure 3:
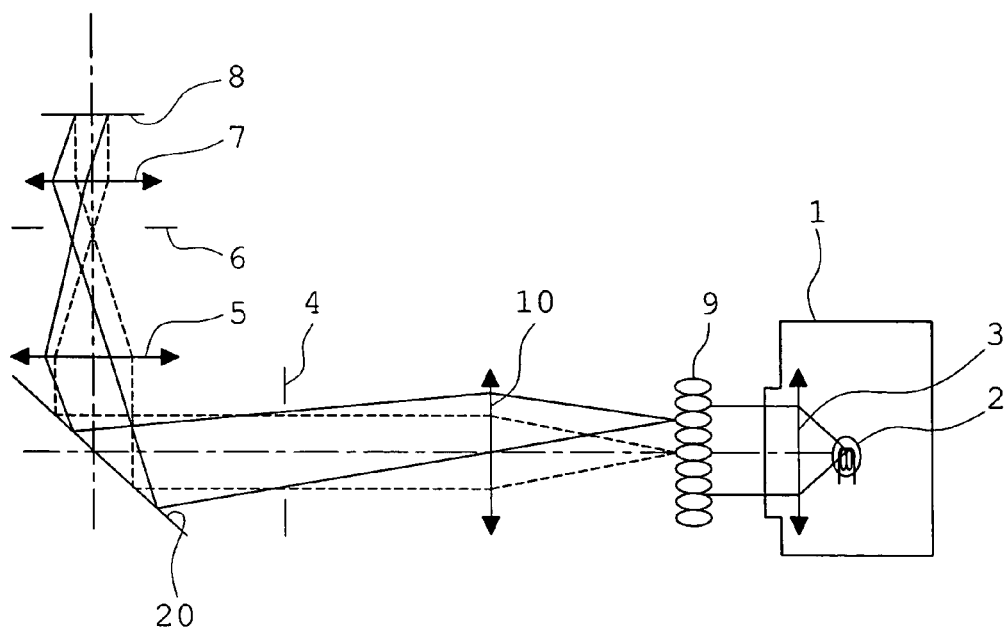
FIG. 3 is a schematic configuration diagram that shows a conventional example of a microscopic transmitting illumination apparatus in which an integrator is used.

In the microscopic illumination apparatus according to the present invention where a light source and an entrance-side focal position of a condenser lens are in conjugate positional relationship, the above-mentioned optical element for obtaining uniform illumination is arranged in a path of a beam of parallel rays. In comparison with an illumination optical system having a configuration as shown in FIG. 3 where a projecting lens 10 is added and an integrator 9 is arranged, via the projecting lens 10 and a field lens 5, to be in conjugate positional relationship with an entrance-side focal position of a condenser lens 7, the configuration of this invention can achieve shortened, or smaller size of the entire length of the illumination optical system by a space otherwise required by the projecting lens 10.

In the microscopic illumination apparatus according to the present invention, the entire amount of illumination light is reduced because axial rays traversing the central region are cut off, attenuated or diffused. However, the microscopic illumination apparatus according to the present invention can efficiently achieve uniform illumination by much reducing loss of amount of light, which would be caused by illuminating a region outside the desired illumination range, in comparison with the configuration where the beam of rays is divided via the integrator 9 having uniform apertures over the entire surface as shown in FIG. 3.

In the microscopic illumination apparatus according to the present invention, it is preferred that the optical element is arranged at a position that is conjugate with a position distant from the illumination target surface by L satisfying the following condition (1):

$$0.03 < |L/f_{CD}| < 0.4 \quad (1)$$

where $f_{CD}$ is a focal length of the condenser lens, and L is a distance from the illumination target surface to a position that is, of positions on which the optical element is projected, closest to the illumination target surface.

A value of $|L/f_{CD}|$ smaller than the lower limit, 0.03 of Condition (1) means a relatively small value of L, that is, the optical element is too close to the illumination target surface. Therefore, if the optical element having different characteristics between the central region and the outer region is arranged at a position conjugate with a position that yields a value below the lower limit of Condition (1), dust or flaw on the optical element is conspicuously imaged.

On the other hand, a value of $|L/f_{CD}|$ greater than the upper limit, 0.4 of Condition (1) means a relatively large value of L, that is, the optical element is too far from the illumination target surface. Therefore, even if the optical element having different characteristics between the central region and the outer region is inserted in the system at a position conjugate with a position that yields a value above the upper limit of Condition (1), the optical element cannot contribute to uniform illumination by precluding illumination unevenness.

Figure 4:
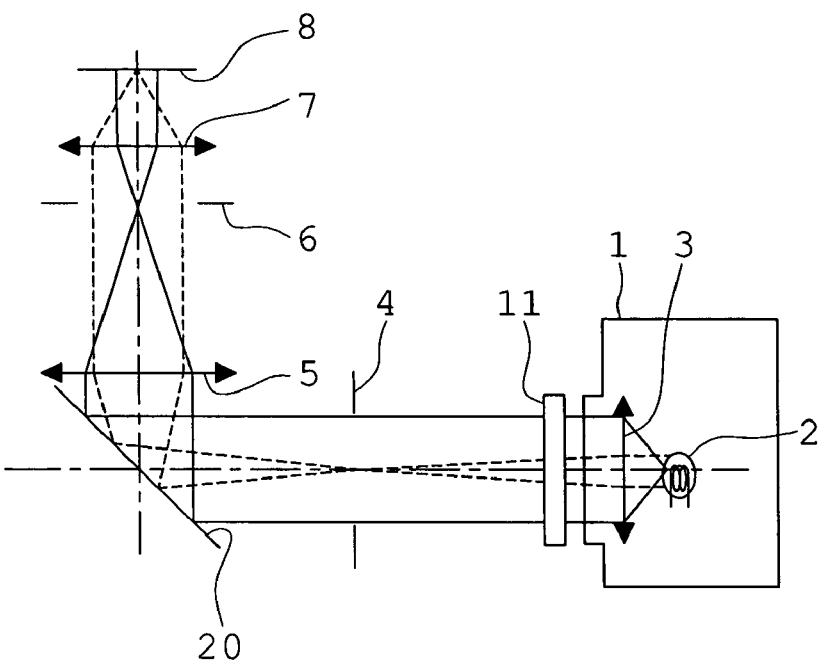
FIG. 4 is a schematic configuration diagram that shows a configuration common to microscopic illumination apparatuses according to the first to eleventh embodiments of the present invention.

FIG. 4 is a schematic configuration diagram that shows a configuration common to microscopic illumination apparatuses according to the later-described first to eleventh embodiments of the present invention. In the microscopic illumination apparatus according to each of the first to eleventh embodiments, an illumination optical system has: a lamp house 1 provided with a light source 2 and a collector lens 3 for converting divergent rays into a beam of substantially parallel rays; a field lens 5 for collecting the beam of substantially parallel rays converted via the collector lens 3; a condenser lens 7 for introducing the beam of rays collected by the field lens 5 onto an illumination target surface 8; and an aperture stop 6 disposed at an entrance-side focal position of the condenser lens 7, the aperture stop 6 and the light source 2 being in substantially conjugate positional relationship, wherein an optical element 11 having different characteristics between the central region and the outer region is disposed in a path of rays converted into the substantially parallel rays. The reference numeral 20 denotes a mirror.

The optical element 11 is disposed at a position that is conjugate with a position distant from the illumination target surface by L satisfying the following condition (1):

$$0.03 < |L/f_{CD}| < 0.4 \quad (1)$$

where $f_{CD}$ is a focal length of the condenser lens, and L is a distance from the illumination target surface to a position that is, of positions on which the optical element is projected, closest to the illumination target surface.

In the microscopic illumination apparatus according to each embodiment of the present invention thus configured, divergent rays emanating from the light source 2 is converted into a beam of parallel rays via the collector lens 3, to be incident on the optical element 11. Rays passing the optical element 11 are reflected at the mirror 20, and, after converging on the position of the aperture stop 6 via the field lens 5, irradiate the illumination target surface 8 via the condenser lens 7.

Here, in the microscopic illumination apparatus according to the present invention, this optical element 11 has different characteristics between the central region and the outer region. Therefore, by configuring it to allow a smaller amount of light to pass the central region than the outer region, it is possible to achieve uniform illumination on the illumination target surface 8 with illumination intensity in the axial region being attenuated.

In the microscopic illumination apparatus according to each embodiment of the present invention, since the optical element 11 is disposed at a position that is conjugate with a position distant from the illumination target surface by L satisfying Condition (1), a position on which the optical element is projected toward the illumination target surface by the illumination optical system is not so close to the illumination target surface as to make dust or flaw, if any, on the optical system to be conspicuously imaged. In addition, since the position on which the optical element is projected toward the illumination target surface by the illumination optical system is not so far from the illumination target surface, insertion of the optical element effectively contributes to uniform illumination light.

First Embodiment

Figure 5A:
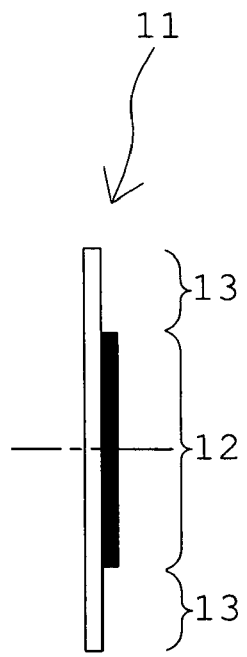
FIGS. 5A and 5B are a side view and a front view, respectively, of an optical element having different characteristics between the central region and the outer region, used in the microscopic illumination apparatus according to the first embodiment of the present invention.
Figure 5B:
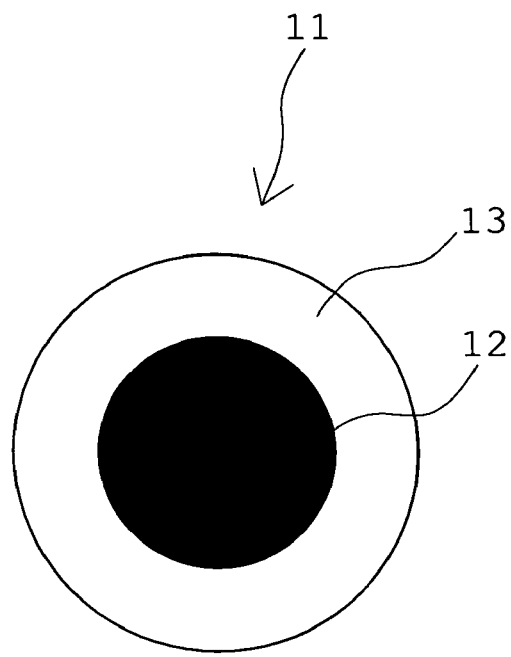

FIGS. 5A and 5B are a side view and a front view, respectively, of an optical element having different characteristics between the central region and the outer region, used in the microscopic illumination apparatus according to the first embodiment of the present invention.

In the microscopic illumination apparatus of the first embodiment, the optical element 11 is composed of a cut-off portion 12 that cuts off rays incident on the central region and a transmissive portion 13 that transmits rays incident in the outer region. The cut-off portion 12 is formed of a circular cut-off plate coaxially arranged on a circular, transparent plane parallel plate having a larger diameter than the cut-off portion 12. The transmissive portion 13 is formed of the remaining annular portion of the circular plane parallel plate with the area covered with the cut-off portion 12 being excepted. The other configuration is substantially the same as the microscopic illumination apparatus shown in FIG. 4.

According to the microscopic illumination apparatus of the first embodiment thus configured, since the optical element 11 cuts off rays incident in the central region via the cut-off portion 12 and transmits rays incident in the outer region via the transmissive portion 13 when light from the collector lens 3 is incident on the optical element 11, illumination intensity in the axial region on the illumination target surface 8 becomes relatively low, to assure uniform illumination light over the entire region of the illumination target surface 8.

The other function and effect are substantially the same as the function and effect of the illumination apparatus shown in FIG. 4.

Second Embodiment

Figure 6A:
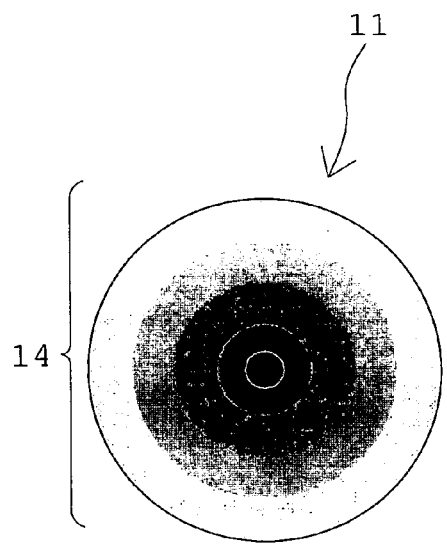
FIGS. 6A and 6B are a front view and a graph that shows transmittance characteristics with respect to distance from the optical axis, respectively, of an optical element having different characteristics between the central region and the outer region, used in the microscopic illumination apparatus according to the second embodiment of the present invention.
Figure 6B:
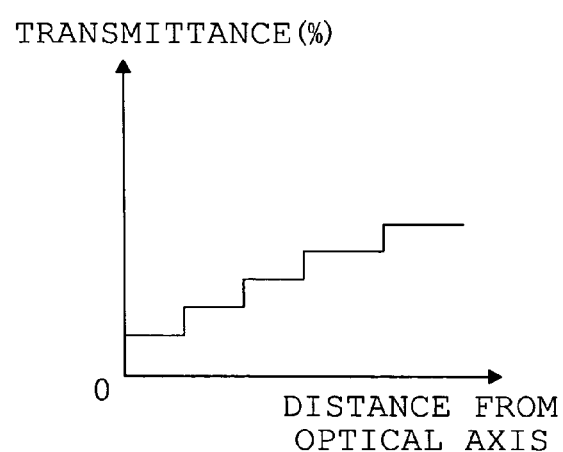

FIGS. 6A and 6B are a front view and a graph that shows transmittance characteristics with respect to distance from the optical axis, respectively, of an optical element having different characteristics between the central region and the outer region, used in the microscopic illumination apparatus according to the second embodiment of the present invention.

In the microscopic illumination apparatus of the second embodiment, the optical element 11 is composed of an attenuating portion 14 that transmits only a part of rays. As shown in FIG. 6B, the attenuating portion 14 has such a characteristic as having a lowest transmittance in the central region (nearest to the optical axis) and a highest transmittance in the outmost region (farthest from the optical axis). Also, the attenuating portion 14 is constructed so that the transmittance varies stepwise from the central region to the outmost region. The other configuration is substantially the same as the microscopic illumination apparatus shown in FIG. 4.

According to the microscopic illumination apparatus of the second embodiment thus configured, since the optical element 11 is made to show a low transmittance for rays incident on the central region and a high transmittance for rays incident on the outer region via the attenuating portion 14 when light from the collector lens 3 is incident on the optical element 11, illumination intensity in the axial region on the illumination target surface 8 becomes relatively low, to assure uniform illumination light over the entire region of the illumination target surface 8. The other function and effect are substantially the same as the function and effect of the illumination apparatus shown in FIG. 4.

Third Embodiment

Figure 7A:
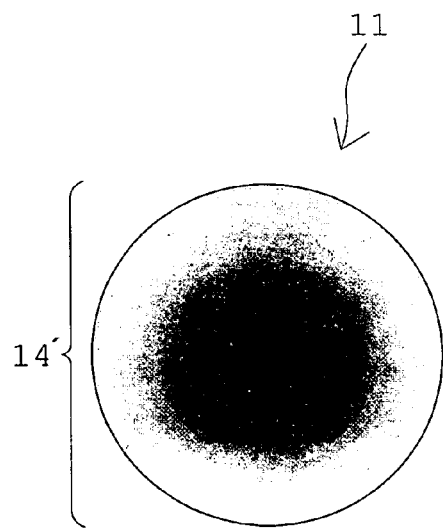
FIGS. 7A and 7B are a front view and a graph that shows transmittance characteristics with respect to distance from the optical axis, respectively, of an optical element having different characteristics between the central region and the outer region, used in the microscopic illumination apparatus according to the third embodiment of the present invention.
Figure 7B:
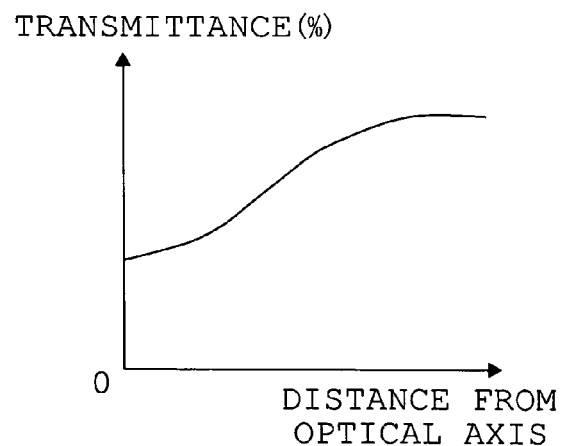

FIGS. 7A and 7B are a front view and a graph that shows transmittance characteristics with respect to distance from the optical axis, respectively, of an optical element having different characteristics between the central region and the outer region, used in the microscopic illumination apparatus according to the third embodiment of the present invention.

In the microscopic illumination apparatus of the third embodiment, the optical element 11 is composed of an attenuating portion 14' that transmits only a part of rays. As shown in FIG. 7B, the attenuating portion 14' has such a characteristic as having a lowest transmittance in the central region (nearest to the optical axis) and a highest transmittance in the outmost region (farthest from the optical axis). Also, the attenuating portion 14' is constructed so that the transmittance varies continuously from the central region to the outmost region. The other configuration is substantially the same as the microscopic illumination apparatus shown in FIG. 4.

According to the microscopic illumination apparatus of the third embodiment thus configured, similar to the microscopic illumination apparatus of the second embodiment, since the optical element 11 is made to show a low transmittance for rays incident on the central region and a high transmittance for rays incident on the outer region via the attenuating portion 14' when light from the collector lens 3 is incident on the optical element 11, illumination intensity in the axial region on the illumination target surface 8 becomes relatively low, to assure uniform illumination light over the entire region of the illumination target surface 8. In addition, according to the third embodiment of the present invention, since the attenuating portion 14' constituting the optical element 11 is constructed such that the transmittance varies continuously from the central region to the outmost region, much uniform illumination light can be obtained. The other function and effect are substantially the same as the function and effect of the illumination apparatus shown in FIG. 4.

Fourth Embodiment

Figure 8A:
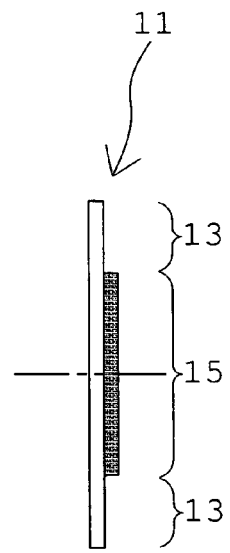
FIGS. 8A and 8B are a side view and a front view, respectively, of an optical element having different characteristics between the central region and the outer region, used in the microscopic illumination apparatus according to the fourth embodiment of the present invention.
Figure 8B:
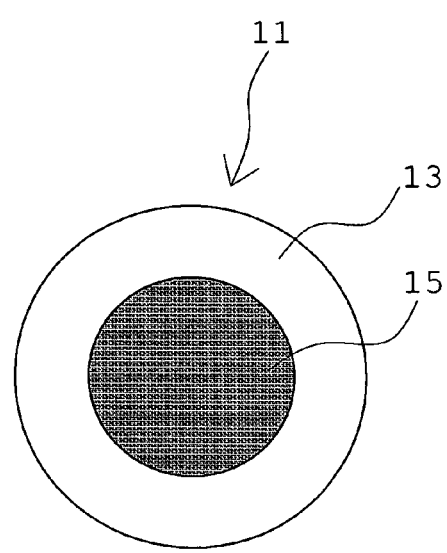

FIGS. 8A and 8B are a side view and a front view, respectively, of an optical element having different characteristics between the central region and the outer region, used in the microscopic illumination apparatus according to the fourth embodiment of the present invention.

In the microscopic illumination apparatus of the fourth embodiment, the optical element 11 is composed of a diffusing portion 15 that diffuses rays incident in the central region and a transmissive portion 13 that transmits rays incident in the outer region. The diffusing portion 15 is formed of a circular diffusing plate coaxially arranged on a circular, transparent plane parallel plate having a larger diameter than the diffusing portion 15. The transmissive portion 13 is formed of the remaining annular portion of the circular plane parallel plate with the area covered with the diffusing portion 15 being excepted. The other configuration is substantially the same as the microscopic illumination apparatus shown in FIG. 4.

According to the microscopic illumination apparatus of the fourth embodiment thus configured, since the optical element 11 reduces amount of transmitted light by diffusing rays incident in the central region via the diffusing portion 15 and transmits rays incident in the outer region as they are via the transmissive portion 13 when light from the collector lens 3 is incident on the optical element 11, illumination intensity in the axial region on the illumination target surface 8 becomes relatively low, to assure uniform illumination light over the entire region of the illumination target surface 8. The other function and effect are substantially the same as the function and effect of the illumination apparatus shown in FIG. 4.

Fifth Embodiment

Figure 9A:
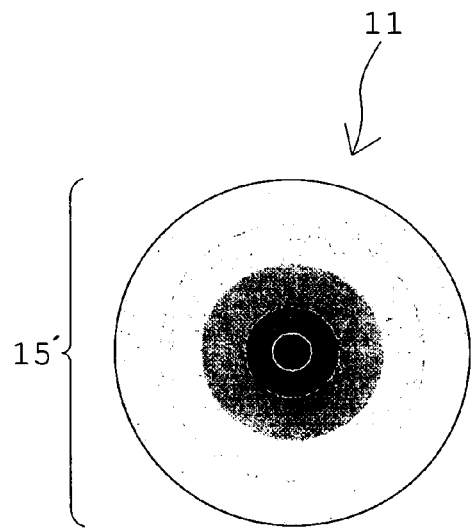
FIGS. 9A and 9B are a front view and a graph that shows half value width of diffusion angle verses distance from the optical axis, respectively, of an optical element having different characteristics between the central region and the outer region, used in the microscopic illumination apparatus according to the fifth embodiment of the present invention.
Figure 9B:
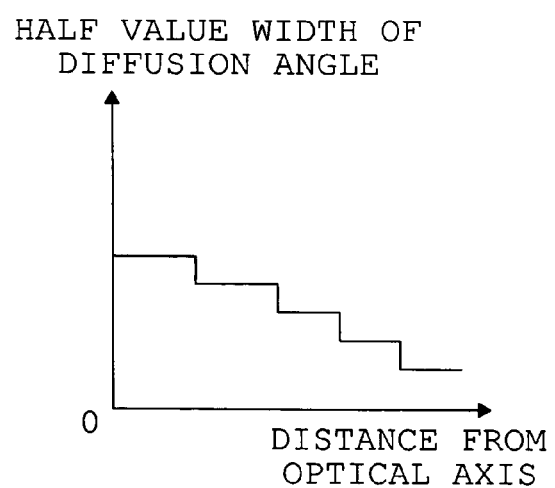

FIGS. 9A and 9B are a front view and a graph that shows half value width of diffusion angle verses distance from the optical axis, respectively, of an optical element having different characteristics between the central region and the outer region, used in the microscopic illumination apparatus according to the fifth embodiment of the present invention.

In the microscopic illumination apparatus of the fifth embodiment, the optical element 11 is composed of a diffusing portion 15' that diffuses rays. As shown in FIG. 9B, the diffusing portion 15' has such a characteristic as having a largest diffusion angle in the central region (nearest to the optical axis) and a smallest diffusion angle in the outmost region (farthest from the optical axis). Also, the diffusing portion 15' is constructed so that the diffusion angle varies stepwise from the central region to the outmost region. The other configuration is substantially the same as the microscopic illumination apparatus shown in FIG. 4.

According to the microscopic illumination apparatus of the fifth embodiment thus configured, since the optical element 11 is made to direct rays around the optical axis with a large diffusion angle in the central region in which the rays are incident and to pass rays substantially straightly with a small diffusion angle in the outer region in which the rays are incident, via the diffusing portion 15', when light from the collector lens 3 is incident on the optical element 11, illumination intensity in the axial region on the illumination target surface 8 becomes relatively low, to assure uniform illumination light over the entire region of the illumination target surface 8. The other function and effect are substantially the same as the function and effect of the illumination apparatus shown in FIG. 4.

Sixth Embodiment

Figure 10A:
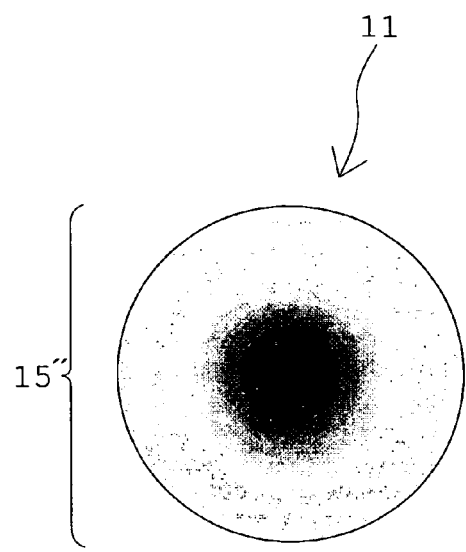
FIGS. 10A and 10B are a front view and a graph that shows half value width of diffusion angle verses distance from the optical axis, respectively, of an optical element having different characteristics between the central region and the outer region, used in the microscopic illumination apparatus according to the sixth embodiment of the present invention.
Figure 10B:
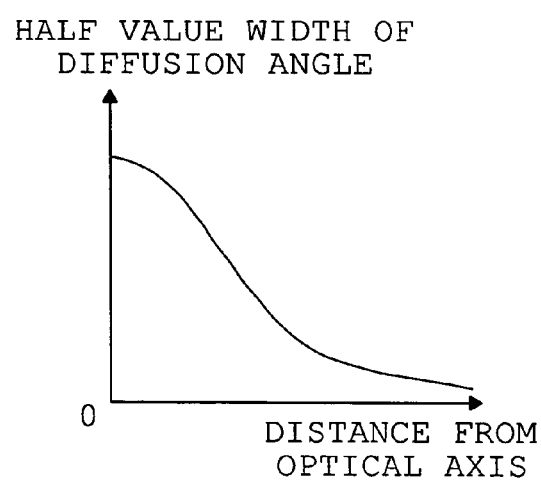

FIGS. 10A and 10B are a front view and a graph that shows half value width of diffusion angle verses distance from the optical axis, respectively, of an optical element having different characteristics between the central region and the outer region, used in the microscopic illumination apparatus according to the sixth embodiment of the present invention.

In the microscopic illumination apparatus of the sixth embodiment, the optical element 11 is composed of a diffusing portion 15" that diffuses rays. As shown in FIG. 10B, the diffusing portion 15" has such a characteristic as having a largest diffusion angle in the central region (nearest to the optical axis) and a smallest diffusion angle in the outmost region (farthest from the optical axis). Also, the diffusing portion 15" is constructed so that the diffusion angle varies continuously from the central region to the outmost region. The other configuration is substantially the same as the microscopic illumination apparatus shown in FIG. 4.

According to the microscopic illumination apparatus of the sixth embodiment thus configured, similar to the microscopic illumination apparatus of the second embodiment, since the optical element 11 is made to direct rays around the optical axis with a large diffusion angle in the central region in which the rays are incident and to pass rays substantially straightly with a small diffusion angle in the outer region in which the rays are incident, via the diffusing portion 15", when light from the collector lens 3 is incident on the optical element 11, illumination intensity in the axial region on the illumination target surface 8 becomes relatively low, to assure uniform illumination light over the entire region of the illumination target surface 8. In addition, according to the sixth embodiment of the present invention, since the diffusing portion 15" constituting the optical element 11 is constructed such that the transmittance varies continuously from the central region to the outmost region, much uniform illumination light can be obtained. The other function and effect are substantially the same as the function and effect of the illumination apparatus shown in FIG. 4.

Seventh Embodiment

Figure 11A:
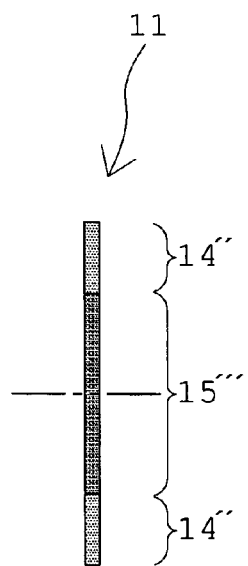
FIGS. 11A and 11B are a side view and a front view, respectively, of an optical element having different characteristics between the central region and the outer region, used in the microscopic illumination apparatus according to the seventh embodiment of the present invention.
Figure 11B:
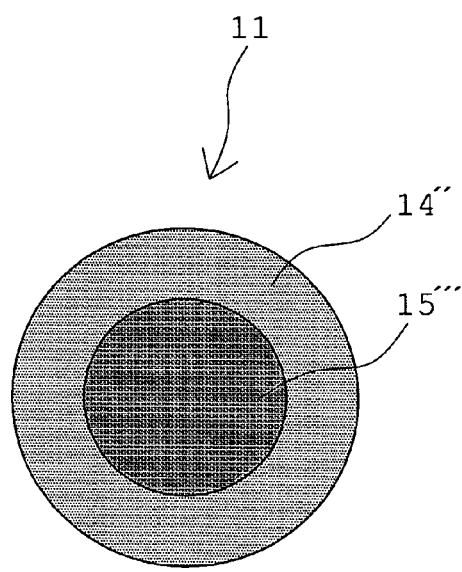

FIGS. 11A and 11B are a side view and a front view, respectively, of an optical element having different characteristics between the central region and the outer region, used in the microscopic illumination apparatus according to the seventh embodiment of the present invention.

In the microscopic illumination apparatus of the seventh embodiment, the optical element 11 is composed of a diffusing portion 15''' that diffuses rays incident in the central region and an attenuating portion 14" that attenuates an amount of light incident in the outer region. The diffusing portion 15''' is formed of a circular diffusing plate. The attenuating portion 14" is shaped as an annulus having a predetermined width surrounding the diffusing portion 15'''. The diffusing portion 15''' and the attenuating portion 14" are fitted to one another. The amount of attenuation by the attenuating portion 14" is arranged very low. The other configuration is substantially the same as the microscopic illumination apparatus shown in FIG. 4.

According to the microscopic illumination apparatus of the seventh embodiment thus configured, since the optical element 11 reduces amount of transmitted light by diffusing rays incident in the central region via the diffusing portion 15''' and transmits rays incident in the outer region substantially as they are upon keeping the attenuation rate as low as possible via the attenuating portion 14" when light from the collector lens 3 is incident on the optical element 11, illumination intensity in the axial region on the illumination target surface 8 becomes relatively low, to assure uniform illumination light over the entire region of the illumination target surface 8. The other function and effect are substantially the same as the function and effect of the illumination apparatus shown in FIG. 4.

Eighth Embodiment

Figure 12A:
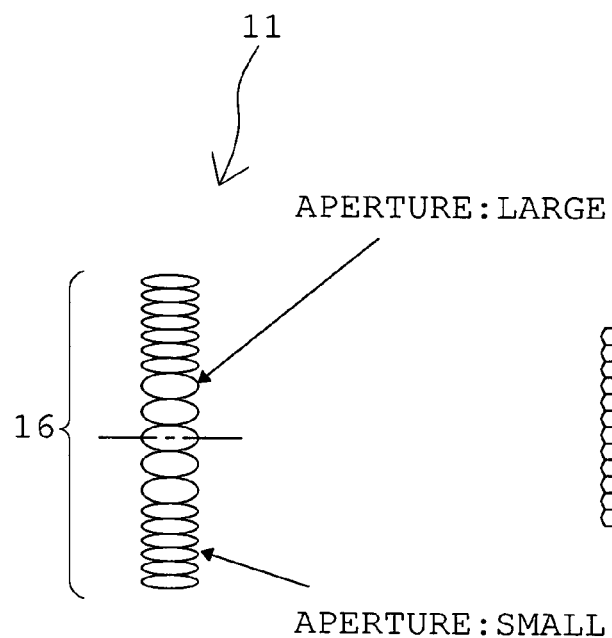
FIGS. 12A and 12B are a side view and a front view, respectively, of an optical element having different characteristics between the central region and the outer region, used in the microscopic illumination apparatus according to the eighth embodiment of the present invention.
Figure 12B:
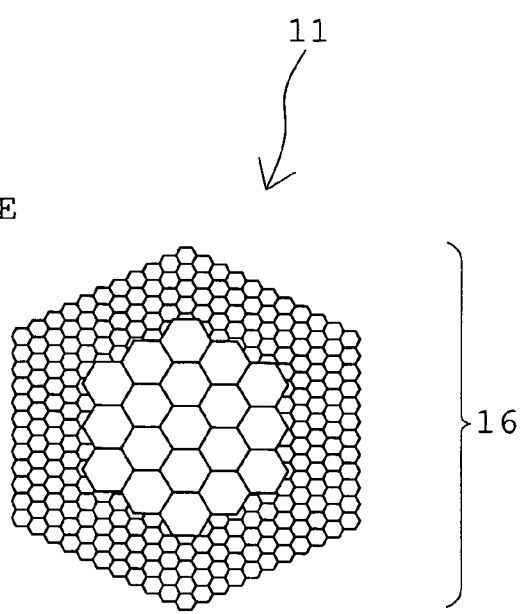
Figure 13:
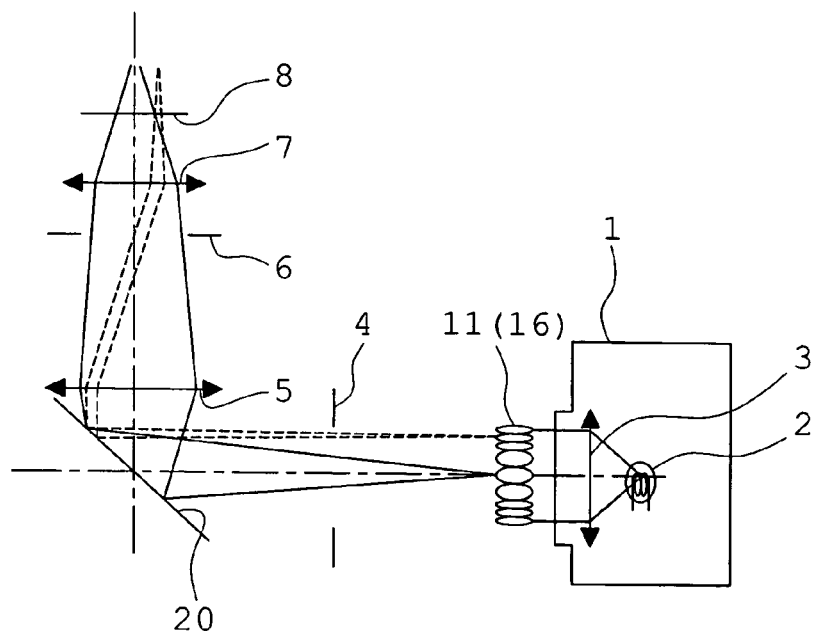
FIG. 13 is an explanatory diagram that shows a schematic configuration, with traveling paths of rays, of the microscopic illumination apparatus according to the eighth embodiment of the present invention.

FIGS. 12A and 12B are a side view and a front view, respectively, of an optical element having different characteristics between the central region and the outer region, used in the microscopic illumination apparatus according to the eighth embodiment of the present invention. FIG. 13 is an explanatory diagram that shows a schematic configuration, with traveling paths of rays, of the microscopic illumination apparatus according to the eighth embodiment.

In the microscopic illumination apparatus of the eighth embodiment, the optical element 11 is composed of an optical integrator 16 configured to have an aperture characteristic distribution such that apertures are smaller at a region farther from the central region. The other configuration is substantially the same as the microscopic illumination apparatus shown in FIG. 4.

According to the microscopic illumination apparatus of the eighth embodiment thus configured, diffusing function strongly effects in the central region of the integrator 16 via the large apertures, to disperse light around the central region when light from the collector lens 3 is incident on the optical integrator 16, or the optical element 11. Therefore, light passing the central region of the optical integrator 16 has a larger aperture angle as shown by the solid lines, to be converted into light for illuminating a range (a range extending to the peripheral region in the illumination target range 8) wider than the vicinity of the field center, which should have been the range to be illuminated otherwise. On the other hand, in the outer region of the optical integrator 16, diffusing function is weak, to cause less dispersion. Therefore, light passing the outer region of the optical integrator 16 keeps a small aperture angle as shown by the broken lines, to illuminate only the field periphery (only the peripheral region in the illumination target range 8).

In this way, according to the microscopic illumination apparatus of the eighth embodiment, owing to the characteristics of the optical integrator 16, out of rays incident on the optical integrator 16, rays incident on the optical axis (i.e. The central region of the optical integrator 16), which involve a large amount of light, are introduced to a larger range on the illumination target surface 8 and rays incident in the outer region of the optical integrator 16, which involve a small amount of light, are introduced only to the periphery of the illumination target surface 8.

Therefore, according to the microscopic illumination apparatus of the eighth embodiment, illumination intensity in the axial region on the illumination target surface 8 becomes relatively low, to assure uniform illumination light over the entire region of the illumination target surface 8. Furthermore, in comparison with the configuration where the beam of rays is divided via the integrator 9 having uniform apertures over the entire surface from the central region to the outer region as shown in FIG. 3, the microscopic illumination apparatus of the eighth embodiment can efficiently achieve uniform illumination by much reducing loss of amount of light, which would be caused by illuminating a region outside the desired illumination range.

Also, in the microscopic illumination apparatus of the eighth embodiment where the light source and the entrance-side focal position of the condenser lens are in conjugate positional relationship, the configuration is made so that the optical integrator 16, as the optical element 11, is arranged in a path of a beam of parallel rays and that such a projecting lens 10 as shown in FIG. 3 is not arranged. Therefore, according to the microscopic illumination apparatus of the eighth embodiment, while using an integrator lens, it is possible to achieve shortened, or smaller size of the entire length of the illumination optical system by a space otherwise required by the projecting lens 10, in comparison with the illumination optical system having the configuration where the projecting lens 10 shown in FIG. 3 is arranged. The other function and effect are substantially the same as the function and effect of the illumination apparatus shown in FIG. 4.

Ninth Embodiment

Figure 14A:
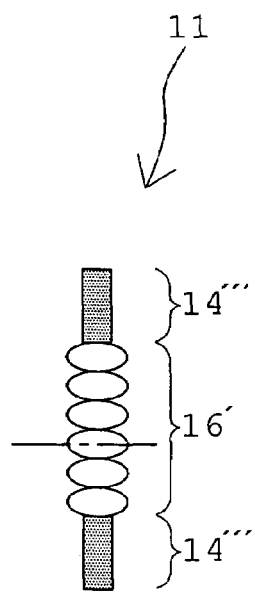
FIGS. 14A and 14B are a side view and a front view, respectively, of an optical element having different characteristics between the central region and the outer region, used in the microscopic illumination apparatus according to the ninth embodiment of the present invention.
Figure 14B:
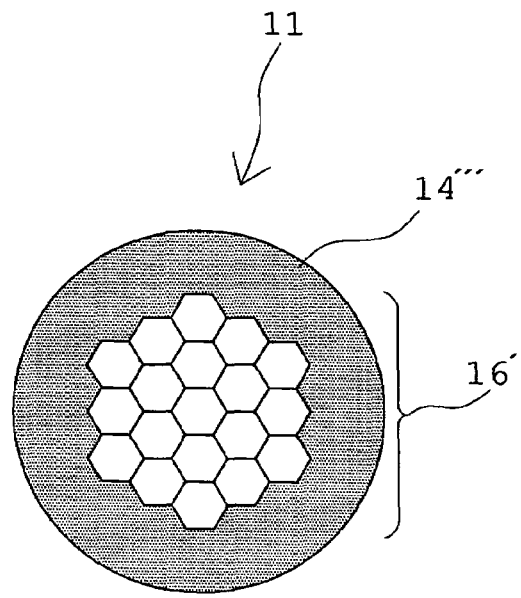

FIGS. 14A and 14B are a side view and a front view, respectively, of an optical element having different characteristics between the central region and the outer region, used in the microscopic illumination apparatus according to the ninth embodiment of the present invention.

In the microscopic illumination apparatus of the ninth embodiment, the optical element 11 is composed of an optical integrator 16' arranged in the central region and an attenuating portion 14''' arranged in the outer region. The other configuration is substantially the same as the microscopic illumination apparatus shown in FIG. 4.

According to the microscopic illumination apparatus of the ninth embodiment thus configured, since the optical element 11 reduces amount of transmitted light by diffusing rays incident in the central region via the optical integrator 16' and transmits rays incident in the outer region substantially as they are upon keeping the attenuation rate as low as possible via the attenuating portion 14''' when light from the collector lens 3 is incident on the optical element 11, illumination intensity in the axial region on the illumination target surface 8 becomes relatively low, to assure uniform illumination light over the entire region of the illumination target surface 8. Furthermore, in comparison with the configuration where the beam of rays is divided via the integrator 9 having uniform apertures over the entire surface from the central region to the outer region as shown in FIG. 3, the microscopic illumination apparatus of the ninth embodiment can efficiently achieve uniform illumination by much reducing loss of amount of light, which would be caused by illuminating a region outside the desired illumination range.

Also, in the microscopic illumination apparatus of the ninth embodiment where the light source and the entrance-side focal position of the condenser lens are in conjugate positional relationship, the configuration is made so that the optical integrator 16', as the optical element 11, is arranged in a path of a beam of parallel rays and that such a projecting lens 10 as shown in FIG. 3 is not arranged. Therefore, according to the microscopic illumination apparatus of the ninth embodiment, while using an integrator lens, it is possible to achieve shortened, or smaller size of the entire length of the illumination optical system by a space otherwise required by the projecting lens 10, in comparison with the illumination optical system having the configuration where the projecting lens 10 shown in FIG. 3 is arranged. The other function and effect are substantially the same as the function and effect of the illumination apparatus shown in FIG. 4.

In each of the first to ninth embodiments, it is preferred that the optical element 11 is configured to be insertable and removable in and out of the path of rays.

In photographing under a microscope, there may be some cases, depending on the configuration of the objective lens, where unevenness of illumination light is not conspicuous even by photographing with a digital lens, such as a case where the objective lens has a high magnification. In some other cases, a digital lens is not used for photographing. In such a case, it is not necessary to uniform the illumination light on the illumination target surface and thus the optical element 11 is dispensable. In this situation, if the optical element 11 is made removable from the path of rays, brightness of illumination light can be increased by the amount which should have been reduced via the optical element 11.

Tenth Embodiment

Figure 15A:
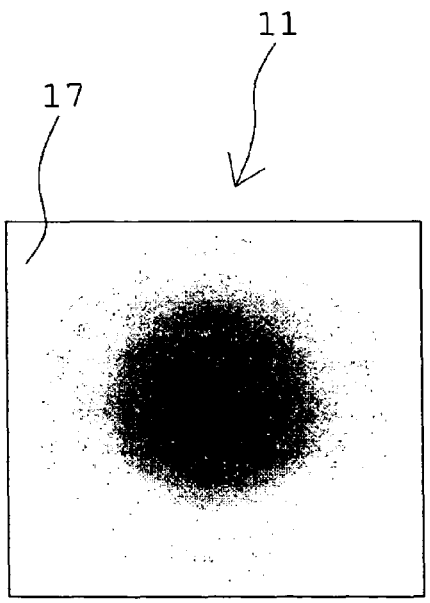
FIGS. 15A and 15B are a front view and a graph that shows transmittance characteristics with respect to distance from the optical axis, respectively, of an optical element having different characteristics between the central region and the outer region, used in the microscopic illumination apparatus according to the tenth embodiment of the present invention.
Figure 15B:
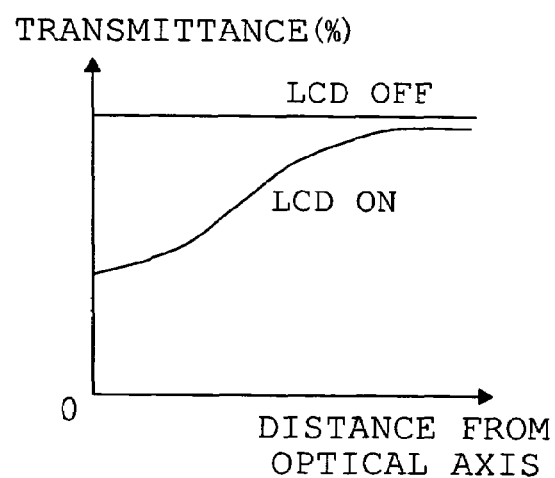

FIGS. 15A and 15B are a front view and a graph that shows transmittance characteristics with respect to distance from the optical axis, respectively, of an optical element having different characteristics between the central region and the outer region, used in the microscopic illumination apparatus according to the tenth embodiment of the present invention.

In the microscopic illumination apparatus of the tenth embodiment, the optical element 11 is composed of an LAD 17. The LAD 17 is configured to have a transmittance characteristic changeable between a state where a transmittance is lowest in the central region and highest in the outmost region and a state where the transmittance is uniform. Change of the transmittance characteristic is made by ON/OFF switching of an LAD driving device not shown. The other function and effect are substantially the same as the function and effect of the illumination apparatus shown in FIG. 4.

According to the microscopic illumination apparatus of the tenth embodiment thus configured, under the condition where the LAD driving device is ON, since the optical element 11 is made to show a lowest transmittance for rays incident on the central region and a highest transmittance for rays incident on the outmost region via the LAD 17 constituting the optical element 11, illumination intensity in the axial region on the illumination target surface 8 becomes relatively low, to assure uniform illumination light over the entire region of the illumination target surface 8. On the other hand, under the condition where the LAD driving device is OFF, the transmittance is uniform over the entire surface of the LAD 17. Therefore, in microscopic observation, in a case where uniform illumination light on the illumination target surface is not necessary, such as a case where the objective lens has a high magnification or photographing is made not by a digital lens, it is possible to attain illumination light with increased brightness by the amount that should have been reduced under the ON condition of the LAD 17 without removing the optical element 11 from the path of rays.

Furthermore, the configuration of the microscopic illumination apparatus of the tenth embodiment may be modified such that the optical element 11 is adjustable to have a desired transmittance at a desired portion over the entire region of the optical element 11. In such a configuration, illumination light on the illumination target surface can be freely adjustable in accordance with an object for observation and a method of observation, to broaden application of the microscopic illumination. The other function and effect are substantially the same as the function and effect of the illumination apparatus shown in FIG. 4.

Eleventh Embodiment

Figure 16:
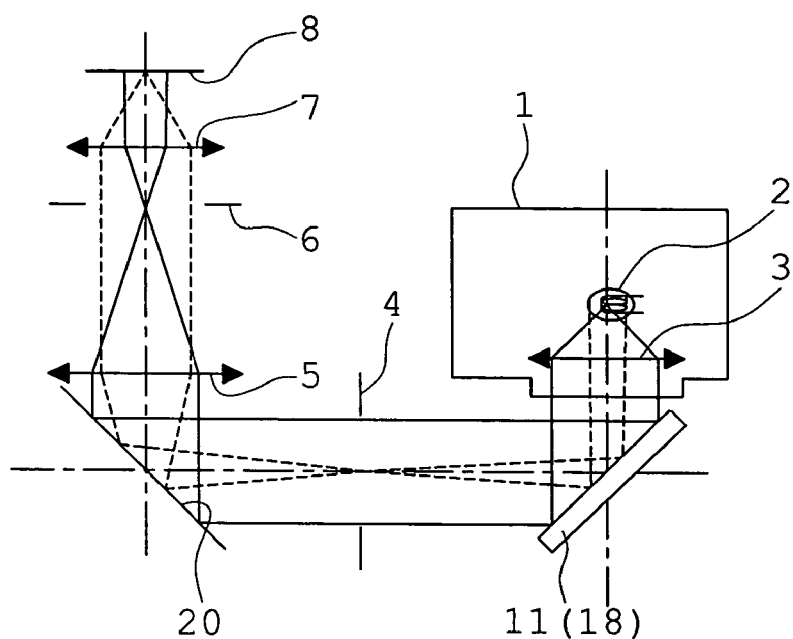
FIG. 16 is a schematic configuration diagram of the microscopic illumination apparatus according to the eleventh embodiment of the present invention.

FIG. 16 is a schematic configuration diagram of the microscopic illumination apparatus according to the eleventh embodiment of the present invention.

In the microscopic illumination apparatus of the eleventh embodiment, the optical element 11 is composed of a DAD 18. The DAD 18 reflects light from the lamp house 1 toward the condenser lens 7. Micro mirrors constituting the DAD 18 are constructed to be individually movable and are controllable with respect to orientation of reflecting surfaces thereof such that a ray coming from the collector lens 3 and incident in a region farther from the central region is reflected to be less inclined away from the condenser lens 7 as it is incident on the condenser lens 7. Control of the micro mirrors is performed via a DAD drive control system not shown. Individual micro mirrors are controlled so that a micro mirror arranged in the central region of the DAD 18 introduces incident rays from the collector lens 3 to be inclined away from the condenser lens 7 and a micro mirror arranged in the outer region of the DAD 18 introduces incident rays from the collector lens 3 not to be inclined away from the condenser lens 7. The other configuration is substantially the same as the microscopic illumination apparatus shown in FIG. 4.

According to the microscopic illumination apparatus of the eleventh embodiment thus configured, since a micro mirror of the DAD 18 arranged in a region farther from the central region reflects incident rays coming from the collector lens 3 toward a direction less inclined away from the condenser lens 7, illumination intensity in the axial region on the illumination target surface 8 becomes relatively low, to assure uniform illumination light over the entire region of the illumination target surface 8.

Also, according to the microscopic illumination apparatus of the eleventh embodiment, orientation of the reflecting surfaces of the micro mirrors can be made uniform over the entire region of the optical element 11. Therefore, in microscopic observation, in a case where uniform illumination light on the illumination target surface is not necessary, such as a case where the objective lens has a high magnification or photographing is made not by a digital lens, it is possible to attain illumination light with increased brightness by the amount that should have been reduced under the condition where orientation of the micro mirrors of the DAD 18 varies from the central region to the outer region.

Furthermore, the configuration of the microscopic illumination apparatus of the eleventh embodiment may be modified such that the reflecting surfaces of the micro mirrors of the DAD 18 are adjustable to have a desirable orientation at a desirable portion in the entire region of the optical element 11. In such a configuration, illumination light on the illumination target surface can be freely adjustable in accordance with an object for observation and a method of observation, to broaden application of the microscopic illumination. The other function and effect are substantially the same as the function and effect of the illumination apparatus shown in FIG. 4.

Twelfth Embodiment

Figure 17:
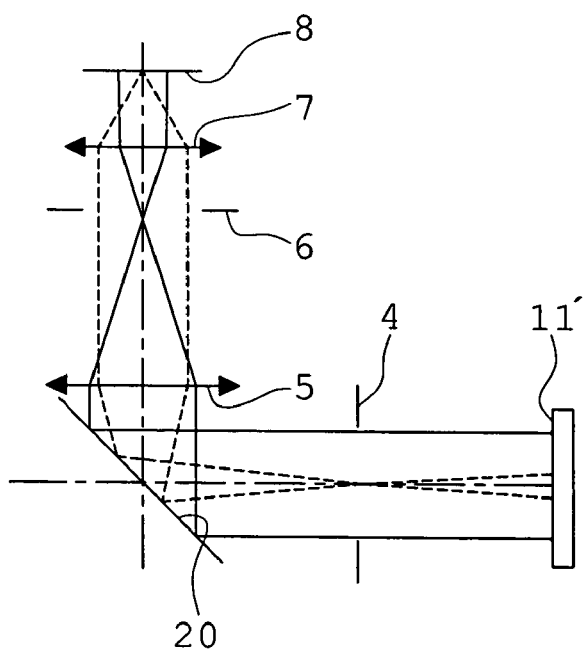
FIG. 17 is a schematic configuration diagram of the microscopic illumination apparatus according to the twelfth embodiment of the present invention.

FIG. 17 is a schematic configuration diagram of the microscopic illumination apparatus according to the twelfth embodiment of the present invention.

Figure 18A:
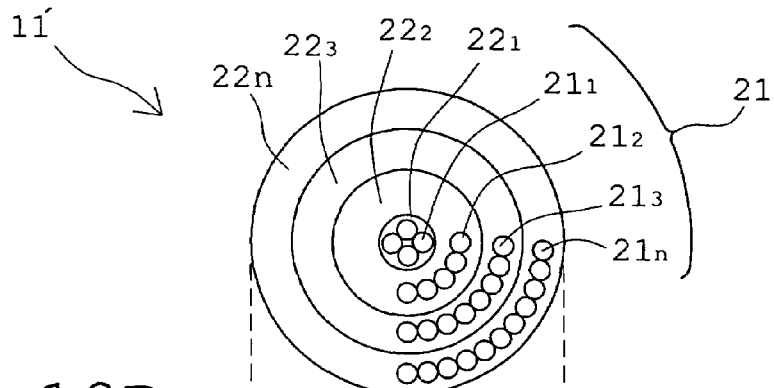
FIGS. 18A and 18B are a front view and a graph that shows emission intensity verses distance from the optical axis, respectively, of an optical element having different characteristics between the central region and the outer region, used in the microscopic illumination apparatus shown in FIG. 17.
Figure 18B:
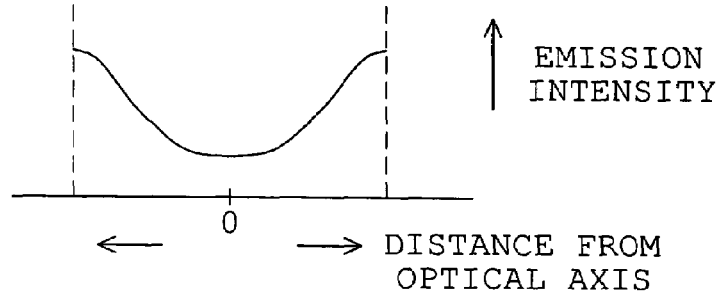

FIGS. 18A and 18B are a front view and a graph that shows emission intensity verses distance from the optical axis, respectively, of an optical element 11' used in the microscopic illumination apparatus shown in FIG. 17.

In the microscopic illumination apparatus of the twelfth embodiment, the optical element 11' is composed of a collective 21 of surface emitting LEADS. The optical element 11' composed of the collective 21 of LEADS functions as a combination of the lamp house 1 and the optical element 11 shown in FIG. 4. The collective 21 is segmented into a plurality of concentric circular blocks $22_1$-$22_n$. A plurality of surface emitting LEADS $21_1$-$21_n$ are arranged in the blocks $22_1$-$22_n$, in such a manner that, between different blocks, a block located farther from the central region contains LEADS having a higher emission intensity and, in a same block, LEADS have a uniform emission intensity. The other configuration is substantially the same as the microscopic illumination apparatus shown in FIG. 4.

According to the microscopic illumination apparatus of the twelfth embodiment thus configured, since the optical element 11' emits light via the LEADS $21_1$-$21_n$, arranged in the blocks $22_1$-$22_n$ in such a manner that LEADS in a block located farther from the central region have a higher emission intensity, illumination intensity in the axial region on the illumination target surface 8 becomes relatively low, to assure uniform illumination light over the entire region of the illumination target surface 8. Furthermore, according to the microscopic illumination apparatus of the twelfth embodiment, since the optical element 11' composed of the collective 21 of LEADS functions as a combination of the lamp house 1 and the optical element 11 shown in FIG. 4, the number of components can be reduced for it, and accordingly cost reduction can be achieved. The other function and effect are substantially the same as the function and effect of the illumination apparatus shown in FIG. 4.

In the example of FIGS. 18A-18B, the collective 21 of LEADS is configured to arrange LEADS having different emission intensities between different blocks. However, the configuration may be made to arrange a plurality of surface emitting LEADS having a same emission intensity at a higher density in a block farther from the block in the central region. Alternatively, the collective 21 of LEADS may be configured so that emission intensity of the LEADS is controllable by individual blocks via a control circuit not shown to have a higher value in a block farther from the block in the central region. In this case, it is much preferred that emission intensity is adjustable by individual blocks in such a way to perform, in accordance with an objective lens in use, light amount control for obviating unevenness of illumination light. Driving of the light amount control in each block can be carried out by control via an ICE or the like or in association with a light control volume.

Furthermore, the configuration for adjusting emission intensity by individual blocks via the control circuit may be used so that, upon a condition of a picked-up image by a camera being fed back, emission intensities of the LEADS are varied by individual blocks for differentiating the amount of light by areas in the picked-up image.

Thirteenth Embodiment

Figure 19A:
FIGS. 19A and 19B are a front view and a graph that shows emission intensity verses distance from the optical axis, respectively, of an optical element having different characteristics between the central region and the outer region, used in the microscopic illumination apparatus according to the thirteenth embodiment of the present invention.
Figure 19B:
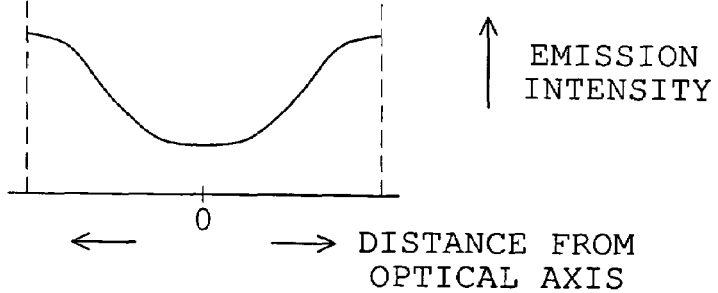

FIGS. 19A and 19B are a front view and a graph that shows emission intensity verses distance from the optical axis, respectively, of an optical element 11' used in the microscopic illumination apparatus according to the thirteenth embodiment of the present invention.

In the microscopic illumination apparatus of the thirteenth embodiment, the optical element 11' is composed of a collective 21' of surface emitting LEADS. The collective 21' of LEADS is composed of a plurality of LEADS $21_1$'. The optical element 11' composed of the collective 21' of LEADS functions as a combination of the lamp house 1 and the optical element 11 shown in FIG. 4. The plurality of surface emitting LEADS $21_1$' are arranged in a matrix. The individual surface emitting LEADS $21_1$' are configured so that their emission intensities are controllable via a control circuit not shown, to adjust emission intensity from the central region to the outer region of the collective 21'. The other configuration is substantially the same as the microscopic illumination apparatus shown in FIG. 17.

According to the microscopic illumination apparatus of the thirteenth embodiment thus configured, since the optical element 11' emits light via the LEADS $21_1$' arranged in a matrix to have a higher emission intensity in a region located farther from the central region, illumination intensity in the axial region on the illumination target surface 8 becomes relatively low, to assure uniform illumination light over the entire region of the illumination target surface 8. Furthermore, according to the microscopic illumination apparatus of the thirteenth embodiment, since the optical element 11' composed of the collective 21' of LEADS functions as a combination of the lamp house 1 and the optical element 11 shown in FIG. 4, the number of components can be reduced for it, and accordingly cost reduction can be achieved. The other function and effect are substantially the same as the function and effect of the illumination apparatus shown in FIG. 4.

In the example of FIGS. 19A-19B, the collective 21' of LEADS is configured so that emission intensity of the individual surface emitting LEADS $21_1$' arranged in a matrix is controllable via the control circuit to have a higher value in a region farther from the central region. However, the configuration may be made to arrange a plurality of surface emitting LEADS $21_1$' having a same emission intensity at a higher density in a region farther from the central region. Also, it is preferred that emission intensity is adjustable for individual surface emitting LEADS $21_1$' arranged in a matrix in such a way to perform, in accordance with an objective lens in use, light amount control for obviating unevenness of illumination light. Driving of emission intensity adjustment for each surface emitting LED $21_1$' can be carried out by control via an ICE or the like or in association with a light control volume. Furthermore, the configuration for adjusting emission intensity via the control circuit may be used so that, upon a condition of a picked-up image by a camera being fed back, emission intensities of the individual LEADS $21_1$' are varied for differentiating the amount of light by areas in the picked-up image.

Fourteenth Embodiment

Figure 20A:
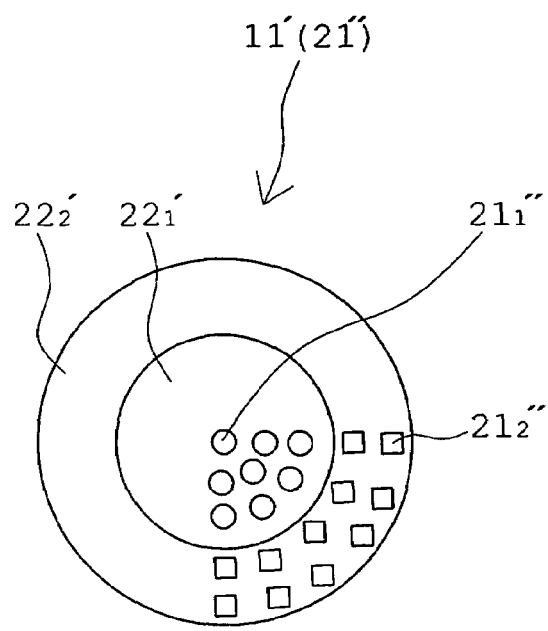
FIGS. 20A, 20B and 20C are a front view, an explanatory diagram that shows directionality of LEADS arranged in the central region, and an explanatory diagram that shows directionality of LEADS arranged in the outer region, respectively, of an optical element having different characteristics between the central region and the outer region, used in the microscopic illumination apparatus according to the fourteenth embodiment of the present invention.
Figure 20B:
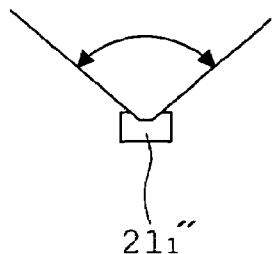
Figure 20C:
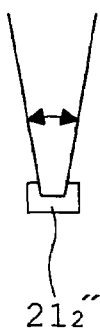

FIGS. 20A, 20B and 20C are a front view, an explanatory diagram that shows directionality of LEADS arranged in the central region, and an explanatory diagram that shows directionality of LEADS arranged in the outer region, respectively, of an optical element 11' used in the microscopic illumination apparatus according to the fourteenth embodiment of the present invention.

In the microscopic illumination apparatus of the fourteenth embodiment, the optical element 11' is composed of a collective 21" of surface emitting LEADS. The optical element 11' composed of the collective 21" of LEADS functions as a combination of the lamp house 1 and the optical element 11 shown in FIG. 4. The collective 21" is segmented into two concentric circular blocks $22_1$' and $22_2$'. A plurality of surface emitting LEADS $21_1$' are arranged in the blocks $22_1$', and a plurality of surface emitting LEADS $21_2$" are arranged in the blocks $22_2$'. The surface emitting LEADS $21_1$" are constructed as LEADS with wide directionality, and the surface emitting LEADS $21_2$" are constructed as LEADS with narrow directionality. The other configuration is substantially the same as the microscopic illumination apparatus shown in FIG. 17.

According to the microscopic illumination apparatus of the fourteenth embodiment thus configured, the plurality of LEADS $21_1$' arranged in the central block $22_1$' emit diffused light due to their wide directionality, while the plurality of LEADS $21_2$" arranged in the outer block $22_2$' emit light with little diffusion due to their narrow directionality. Consequently, illumination intensity in the axial region on the illumination target surface 8 becomes relatively low, to assure uniform illumination light over the entire region of the illumination target surface 8. Furthermore, according to the microscopic illumination apparatus of the fourteenth embodiment, since the optical element 11' composed of the collective 21" of LEADS functions as a combination of the lamp house 1 and the optical element 11 shown in FIG. 4, the number of components can be reduced for it, and accordingly cost reduction can be achieved. The other function and effect are substantially the same as the function and effect of the illumination apparatus shown in FIG. 17.

In the example of FIGS. 20A-20C, the collective 21" of LEADS is divided into two blocks. However, the collective may be segmented into more than two blocks, in which LEADS different in directionality are arranged so that LEADS in a block located farther from the central region have a narrower directionality and LEADS arranged in a same block have a same directionality.

Fifteenth Embodiment

Figure 21:
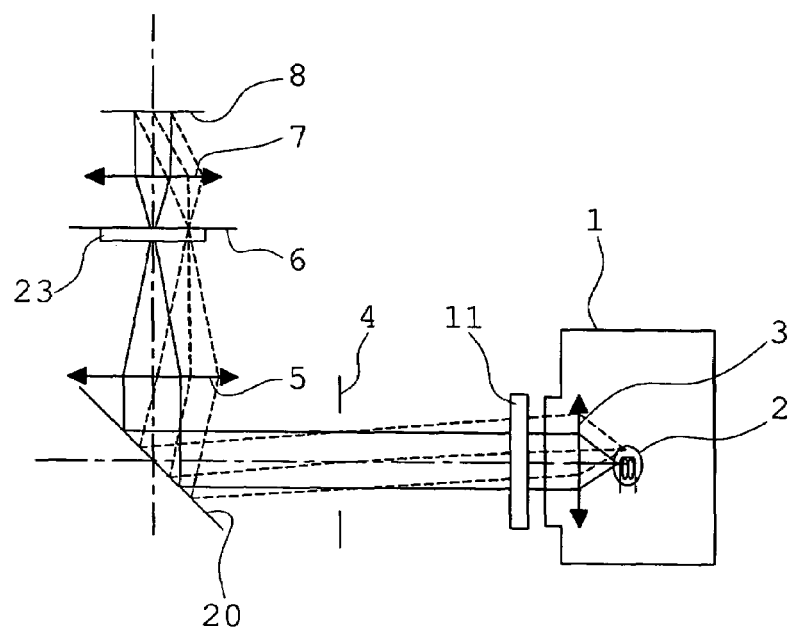
FIG. 21 is an explanatory diagram that shows a schematic configuration of the microscopic illumination apparatus according to the fifteenth embodiment of the present invention and a function of a second optical element included in the apparatus.
Figure 22A:
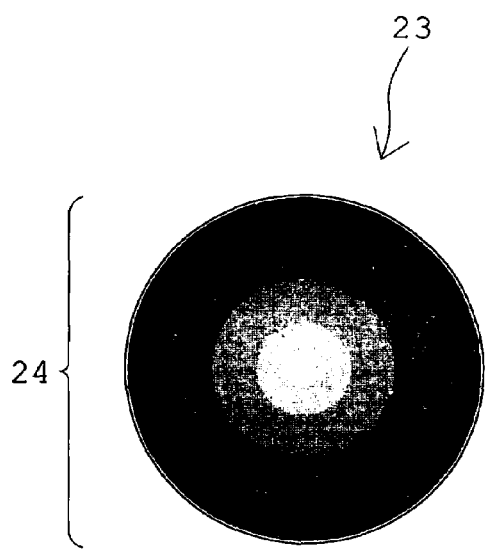
FIGS. 22A and 22B are a front view and a graph that shows transmittance characteristics with respect to distance from the optical axis, respectively, of the second optical element used in the microscopic illumination apparatus shown in FIG. 21.
Figure 22B:
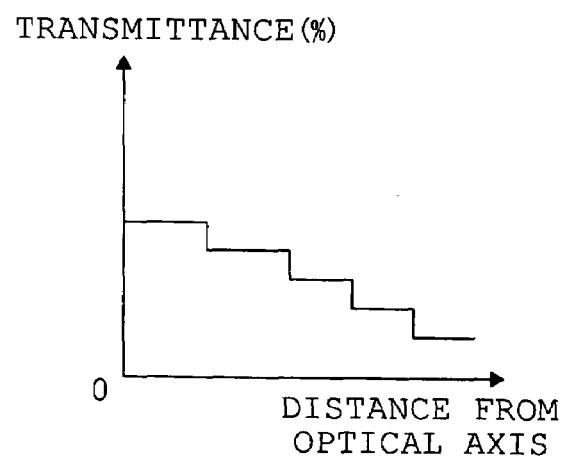
Figure 23:
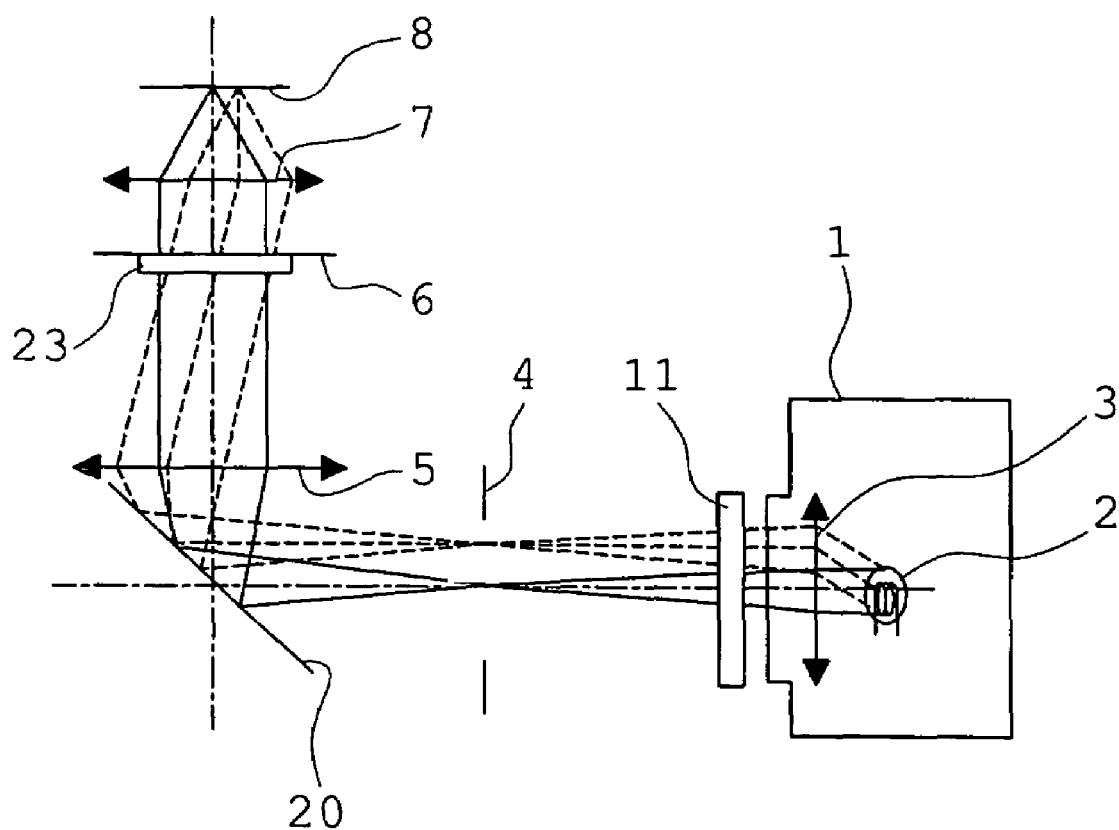
FIG. 23 is an explanatory diagram that shows the function of the optical elements in the microscopic illumination apparatus shown in FIG. 21.

FIG. 21 is an explanatory diagram that shows a schematic configuration of the microscopic illumination apparatus according to the fifteenth embodiment of the present invention and a function of a second optical element 23 included in the apparatus. FIGS. 22A and 22B are a front view and a graph that shows transmittance characteristics with respect to distance from the optical axis, respectively, of the second optical element 23 used in the microscopic illumination apparatus shown in FIG. 21. FIG. 23 is an explanatory diagram that shows the function of the optical elements in the microscopic illumination apparatus shown in FIG. 21.

The microscopic illumination apparatus of the fifteenth embodiment is configured to include, in addition to the configuration common to the first to eleventh embodiments shown in FIG. 4, a second optical element 23 having different characteristics between a central region and an outer region thereof, at the entrance-side focal position of the condenser lens 7 (i.e. On the entrance pupil surface). The second optical element 23 is composed of a second attenuating portion 24 that transmits only apart of incident rays. As shown in FIG. 22B, the second attenuating portion 24 has such a characteristic as having a highest transmittance in the central region (nearest to the optical axis) and a lowest transmittance in the outmost region (farthest from the optical axis). Also, the second attenuating portion 24 is constructed so that the transmittance varies stepwise from the central region to the outmost region. The other configuration is substantially the same as the microscopic illumination apparatus shown in FIG. 4.

As described above, the microscopic illumination apparatus according to each embodiment of the present invention is configured to achieve uniform illumination by reducing illumination intensity in the axial region on the illumination target surface 8 via the optical element 11. Here, the optical element 11 has such a characteristic as having a lowest transmittance on the optical axis and a highest transmittance in the outmost region. Although the entrance pupil position 6 of the condenser lens 7 is not located at a position conjugate with the optical element 11, rays incident at the center of the entrance pupil position 6 of the condenser lens 7 have emerged from the central region of the optical element 11 as shown by the solid lines in FIG. 21, while rays incident on the periphery of the entrance pupil position 6 of the condenser lens 7 have emerged from a region displaced from the central region of the optical element 11 as shown by the broken lines in FIG. 21. Therefore, the intensity distribution at the entrance pupil position 6 of the condenser lens 7 becomes non-uniform due to the characteristic of the optical element 11.

Here, since the microscopic illumination apparatus of the fifteenth embodiment is configured to arrange, at the entrance pupil position 6 of the condenser lens 7, the second optical element 23 having such a characteristic as having a highest transmittance on the optical axis (central region) and a lowest transmittance in the outmost region, non-uniformity of intensity distribution (illumination unevenness) on the entrance pupil position 6 of the condenser lens 7 can be obviated. Also, since the second optical element 23 is arranged on the entrance pupil surface 6 of the condenser lens 7, it fails to cause illumination unevenness by the same reason as the aperture stop 6 fails to cause illumination unevenness (See FIG. 21).

On the other hand, if the light source 2 has emission intensity distribution with respect angle, intensity distribution appears on the surface on which the optical element 11 is arranged. Although the optical element 11 is not located at a position conjugate with the illumination target surface 8, rays illuminating the central region on the illumination target surface 8 have emerged from the central region of the optical element 11 as shown by the solid lines in FIG. 23, while rays incident on the periphery of the illumination target surface 8 have emerged from a region displaced from the central region of the optical element 11 as shown by the broken lines in FIG. 23. Therefore, in a configuration where the optical element 11 is omitted as in the conventional microscopic illumination apparatus, if intensity distribution is produced at a position where the optical element 11 should have been arranged, illumination unevenness appears on the illumination target surface 8. Here, according to the microscopic illumination apparatus of the fifteenth embodiment, illumination intensity in the axial region on the illumination target surface 8 is made relatively low via the optical element 11 that has a characteristic to cut off, attenuate or diffuse rays incident in the central region and to transmit rays incident in the outer region, to assure uniform illumination light over the entire region of the illumination target surface 8 (See FIG. 23), as in the microscopic illumination apparatuses of the first to eleventh embodiments. In this way, according to the microscopic illumination apparatus of the fifteenth embodiment, illumination unevenness is improved by the optical element 11, and, moreover, non-uniformity of intensity distribution (illumination unevenness) on the entrance pupil surface 6 is improved by the second optical element 23.

The other function and effect are substantially the same as the function and effect of the configuration shown in FIG. 4, which is common to the microscopic illumination apparatuses of the first to eleventh embodiments. In the fifteenth embodiment, the second optical element 23 is arranged at the entrance-side focal position (i.e. On the entrance pupil surface 6) of the condenser lens 7 in the configuration shown in FIG. 4, which is common to the microscopic illumination apparatuses of the first to eleventh embodiments. However, the configuration shown in FIG. 17, which is common to the microscopic illumination apparatuses of the twelfth to fourteenth embodiments, may be modified to arrange the second optical element 23 at the entrance-side focal position (i.e. On the entrance pupil surface 6) of the condenser lens 7.

In addition, although the transmittance of the attenuating portion 24 is configured to decrease stepwise from the central region to the outmost region in the example of FIGS. 22A-22B, it may be configured to decrease continuously from the central region to the outmost region. Alternatively, the second optical element 23 may be composed of a second transmissive portion (not shown) for transmitting rays incident in the central region and a second cutoff portion for cutting off rays incident in the outer region. Still alternatively, the second optical element 23 is composed of a second diffusing portion (not shown) having such a characteristic as having a widest directionality in the central region and a narrowest directionality in the outmost region. In this case, the second diffusing potion maybe configured to decrease directionality from the central region to the outmost region stepwise or continuously. Still alternatively, the second optical element 23 may be composed of a second transmissive portion (not shown) for transmitting rays incident in the central region and a second diffusing portion (not shown) for diffusing rays incident in the outer region.

In the microscopic illumination apparatus of the fifteenth embodiment, in a case where such a variant of the second optical element 23 is used, the same function and effect can be obtained as in the case where the second optical element 23 shown in FIGS. 22A-22B is used.

What is claimed is:

1. A microscopic illumination apparatus comprising:
a light source section having a light source, to emit a beam of substantially parallel rays;
an optical element having different characteristics between a central region and an outer region, arranged in a path of the beam of substantially parallel rays;
a field lens for collecting the beam of substantially parallel rays;
a condenser lens for introducing the beam of rays collected by the field lens to an illumination target surface; and
an aperture stop disposed at an entrance-side focal position of the condenser lens,
wherein the aperture stop and the light source are arranged at substantially conjugate positions,
wherein the optical element is composed of a diffusing portion that diffuses rays, and wherein the diffusing portion has a largest diffusion angle in the central region and a smallest diffusion angle in an outmost region, and
wherein the optical element is arranged at a position that is conjugate with a position distant from the illumination target surface by L satisfying the following condition:

$$0.03 < |L/f_{CD}| < 0.4$$

where $f_{CD}$ is a focal length of the condenser lens, and L is a distance from the illumination target surface to a position that is, of positions on which the optical element is projected, closest to the illumination target surface.

2. A microscopic illumination apparatus according to claim 1, wherein a diffusion angle of the diffusing portion varies stepwise from the central region to the outmost region.

3. A microscopic illumination apparatus comprising:
a light source section having a light source, to emit a beam of substantially parallel rays;
an optical element having different characteristics between a central region and an outer region, arranged in a path of the beam of substantially parallel rays;
a field lens for collecting the beam of substantially parallel rays;
a condenser lens for introducing the beam of rays collected by the field lens to an illumination target surface; and
an aperture stop disposed at an entrance-side focal position of the condenser lens, wherein the aperture stop and the light source are arranged at substantially conjugate positions, wherein the optical element is composed of a diffusing portion that diffuses rays incident on the central region and an attenuating portion that attenuates an amount of light incident on the outer region, and wherein the optical element is arranged at a position that is conjugate with a position distant from the illumination target surface by L satisfying the following condition:

$$0.03 < |L/f_{CD}| < 0.4$$

where $f_{CD}$ is a focal length of the condenser lens, and L is a distance from the illumination target surface to a position that is, of positions on which the optical element is projected, closest to the illumination target surface.

4. A microscopic illumination apparatus comprising:

a light source section having a light source, to emit a beam of substantially parallel rays;

an optical element having different characteristics between a central region and an outer region, arranged in a path of the beam of substantially parallel rays;

a field lens for collecting the beam of substantially parallel rays;

a condenser lens for introducing the beam of rays collected by the field lens to an illumination target surface; and an aperture stop disposed at an entrance-side focal position of the condenser lens, wherein the aperture stop and the light source are arranged at substantially conjugate positions, wherein the optical element is composed of an optical integrator arranged in the central region and an attenuating portion that attenuates an amount of light and that is arranged in the outer region, and wherein the optical element is arranged at a position that is conjugate with a position distant from the illumination target surface by L satisfying the following condition:

$$0.03 < |L/f_{CD}| < 0.4$$

where $f_{CD}$ is a focal length of the condenser lens, and L is a distance from the illumination target surface to a position that is, of positions on which the optical element is projected, closest to the illumination target surface.

* * * * *